(12) United States Patent
Potireddy et al.

(10) Patent No.: US 11,593,798 B2
(45) Date of Patent: Feb. 28, 2023

(54) SYSTEMS AND METHODS FOR INSTANT MERCHANT ACTIVATION FOR SECURED IN-PERSON PAYMENTS AT POINT OF SALE

(71) Applicant: WePay, Inc., Redwood City, CA (US)

(72) Inventors: Sireesh Potireddy, Cupertino, CA (US); Rich Aberman, Redwood City, CA (US); John R. Canfield, San Carlos, CA (US)

(73) Assignee: WePay, Inc., Redwood City, CA (US)

( * ) Notice: Subject to any disclaimer, the term of this patent is extended or adjusted under 35 U.S.C. 154(b) by 36 days.

(21) Appl. No.: 16/072,120

(22) PCT Filed: Oct. 13, 2017

(86) PCT No.: PCT/US2017/056674
§ 371 (c)(1),
(2) Date: Jul. 23, 2018

(87) PCT Pub. No.: WO2019/027488
PCT Pub. Date: Feb. 7, 2019

(65) Prior Publication Data
US 2021/0174361 A1 Jun. 10, 2021

Related U.S. Application Data

(60) Provisional application No. 62/540,514, filed on Aug. 2, 2017.

(51) Int. Cl.
*G06Q 20/38* (2012.01)
*G06F 9/54* (2006.01)
(Continued)

(52) U.S. Cl.
CPC ......... *G06Q 20/3829* (2013.01); *G06F 9/547* (2013.01); *G06Q 20/027* (2013.01);
(Continued)

(58) Field of Classification Search
CPC ............. G06Q 20/027; G06Q 20/4016; G06Q 20/4018; G06Q 20/20; G06Q 20/352; G06Q 2220/00
See application file for complete search history.

(56) References Cited

U.S. PATENT DOCUMENTS 5,826,245 A * 10/1998 Sandberg-Diment ....................... G06Q 20/1085 705/40
6,212,635 B1 * 4/2001 Reardon ................. G06F 21/78 726/19
(Continued)

FOREIGN PATENT DOCUMENTS

| KR | 20100001888 A | 1/2010 |
| KR | 20160043472 A | 4/2016 |

OTHER PUBLICATIONS

Sekhar et al (Secure Lightweight Mobile Payment Protocol Using Symmetric Key Techniques) (Year: 2012).*

(Continued)

*Primary Examiner* — Mamon Obeid
(74) *Attorney, Agent, or Firm* — Morgan, Lewis & Bockius LLP; Manita Rawat

(57) ABSTRACT

A new approach is proposed to support instant merchant activation for secured in-person payment at a point of sale (POS) of a merchant. When a customer initiates an in-person payment request at a payment initiation device associated with the merchant, the payment initiation device collects both sensitive and non-sensitive portions of electronic payment transaction data for the request and encrypts the sensitive data portion for secured transmission. A payment gateway in the payment transaction process relays the data and the payment request to a payment processor for approval by an issuer and transmits only the non-sensitive portion of the data to a payment service engine for risk analysis if the (Continued)

payment request is approved by the issuer. The payment service engine determines if the payment request is at high risk based on risk analysis of non-sensitive portion of the data and notifies the payment initiation device and/or merchant accordingly.

20 Claims, 2 Drawing Sheets

(51) Int. Cl.
*G06Q 20/02* (2012.01)
*G06Q 20/20* (2012.01)
*G06Q 20/34* (2012.01)
*G06Q 20/40* (2012.01)
*G06Q 20/32* (2012.01)

(52) U.S. Cl.
CPC ......... *G06Q 20/20* (2013.01); *G06Q 20/326* (2020.05); *G06Q 20/34* (2013.01); *G06Q 20/352* (2013.01); *G06Q 20/4016* (2013.01); *G06Q 20/4018* (2013.01); *G06Q 2220/00* (2013.01)

(56) References Cited

U.S. PATENT DOCUMENTS

| | | | | |
|---|---|---|---|---|
| 6,477,578 | B1* | 11/2002 | Mhoon | G06Q 20/02 709/227 |
| 7,107,242 | B1* | 9/2006 | Vasil | G06Q 20/40 705/35 |
| 7,185,805 | B1* | 3/2007 | McShirley | G06Q 20/042 705/45 |
| 7,472,825 | B2* | 1/2009 | Fitch | G07G 1/01 235/462.01 |
| 7,653,590 | B1* | 1/2010 | Kroon | G06Q 40/025 705/30 |
| 7,657,482 | B1* | 2/2010 | Shirey | G06Q 20/4016 705/40 |
| 8,020,763 | B1* | 9/2011 | Kowalchyk | G06Q 30/06 705/40 |
| 8,458,069 | B2* | 6/2013 | Adjaoute | G06Q 40/02 705/318 |
| 8,740,067 | B1* | 6/2014 | Chinoy | G06Q 20/42 235/375 |
| 9,367,844 | B1* | 6/2016 | Hu | G06Q 20/4016 |
| 9,552,573 | B2* | 1/2017 | Kulpati | G06Q 20/102 |
| 9,600,651 | B1* | 3/2017 | Ryan | G06Q 30/0185 |
| 9,846,866 | B2* | 12/2017 | Royyuru | G06Q 30/06 |
| 10,097,663 | B1* | 10/2018 | Ferenczi | H04L 63/102 |
| 10,325,263 | B2* | 6/2019 | Canfield | G06F 16/285 |
| 10,380,565 | B1* | 8/2019 | Prasad | G06Q 40/00 705/35 |
| 10,762,076 | B1* | 9/2020 | Eide | G06F 6/2379 |
| 2002/0116337 | A1* | 8/2002 | Peled | G06Q 30/06 705/26.1 |
| 2003/0014356 | A1* | 1/2003 | Browne | G06F 17/60 705/38 |
| 2003/0050880 | A1* | 3/2003 | Degen | G06Q 20/40 705/35 |
| 2003/0055783 | A1* | 3/2003 | Cataline | G06Q 20/00 705/40 |
| 2003/0074298 | A1* | 4/2003 | Daum | G06Q 30/06 705/37 |
| 2003/0154393 | A1* | 8/2003 | Young | G06G 11/30 713/200 |
| 2003/0182194 | A1* | 9/2003 | Choey | G06Q 20/326 705/16 |
| 2004/0002903 | A1* | 1/2004 | Stolfo | G06Q 30/06 705/74 |
| 2004/0181679 | A1* | 9/2004 | Dettinger | G06F 21/6245 713/193 |
| 2004/0215560 | A1* | 10/2004 | Amalraj | G06Q 20/04 705/40 |
| 2004/0230527 | A1* | 11/2004 | Hansen | G06Q 20/02 705/40 |
| 2005/0080716 | A1 | 4/2005 | Belyi et al. | |
| 2005/0149552 | A1* | 7/2005 | Chan | G06F 12/00 707/102 |
| 2006/0100957 | A1* | 5/2006 | Buttler et al. | G07F 19/00 705/38 |
| 2006/0226216 | A1* | 10/2006 | Keithley | G06Q 20/4016 235/379 |
| 2007/0033135 | A1* | 2/2007 | Wokaty, Jr. | G06Q 40/00 705/38 |
| 2007/0100751 | A1* | 5/2007 | Carver | G06Q 20/24 705/44 |
| 2007/0106580 | A1* | 5/2007 | Yang | G06Q 20/105 705/35 |
| 2007/0143230 | A1* | 6/2007 | Narainsamy | G06Q 20/40 705/75 |
| 2007/0250441 | A1* | 10/2007 | Paulsen | G06Q 50/188 705/39 |
| 2007/0255653 | A1* | 11/2007 | Tumminaro | G06Q 20/3255 705/39 |
| 2007/0282742 | A1* | 12/2007 | Schrupp | G06Q 20/102 705/40 |
| 2008/0010215 | A1* | 1/2008 | Rackley, III | G06Q 20/326 705/70 |
| 2008/0313081 | A1 | 12/2008 | Wee | |
| 2009/0204510 | A1* | 8/2009 | Hwang | G06Q 20/40 705/40 |
| 2009/0327107 | A1* | 12/2009 | Lal | G06Q 40/12 709/204 |
| 2010/0318468 | A1* | 6/2010 | Carr | G06Q 20/00 705/79 |
| 2010/0180127 | A1* | 7/2010 | Li | H04L 9/3231 713/186 |
| 2010/0274678 | A1* | 10/2010 | Rolf | G06Q 20/20 705/17 |
| 2011/0238564 | A1* | 3/2011 | Lim et al. | G06Q 40/00 705/38 |
| 2011/0137751 | A1* | 6/2011 | Stein | G09B 5/00 705/26.1 |
| 2011/0238510 | A1* | 9/2011 | Rowen | G06V 40/382 705/16 |
| 2012/0023567 | A1* | 1/2012 | Hammad | G06Q 20/4018 726/9 |
| 2012/0054101 | A1* | 3/2012 | Duggal | G06Q 30/018 705/44 |
| 2012/0259782 | A1* | 10/2012 | Hammad | G06Q 20/3674 705/44 |
| 2012/0284187 | A1* | 11/2012 | Hammad | G06Q 20/409 705/44 |
| 2012/0296725 | A1* | 11/2012 | Dessert et al. | G06Q 30/00 705/14.27 |
| 2013/0013512 | A1* | 1/2013 | Cloud | G06Q 20/40 705/44 |
| 2013/0054461 | A1* | 2/2013 | Gupta | G06Q 20/0425 705/44 |
| 2013/0212008 | A1* | 2/2013 | Edwards et al. | G06Q 20/10 705/39 |
| 2013/0132281 | A1* | 5/2013 | Ankolekar | G06Q 20/38215 705/64 |
| 2013/0304637 | A1* | 11/2013 | McCabe | G06Q 40/02 705/39 |
| 2014/0046786 | A1* | 2/2014 | Mazaheri | G06Q 20/20 705/18 |
| 2014/0164243 | A1* | 6/2014 | Aabye | G06Q 20/3825 705/44 |
| 2014/0337138 | A1* | 11/2014 | Chitalia | G06K 19/06028 705/16 |
| 2014/0365366 | A1* | 12/2014 | Spinella | G06Q 20/4012 705/44 |
| 2015/0012436 | A1* | 1/2015 | Poole | G06Q 20/34 705/44 |
| 2015/0161597 | A1* | 6/2015 | Subramanian | G06Q 20/204 705/41 |

(56) References Cited

U.S. PATENT DOCUMENTS

| | | | |
|---|---|---|---|
| 2016/0063470 A1* | 3/2016 | Berrio | G06Q 30/06 705/17 |
| 2016/0171499 A1* | 6/2016 | Meredith | G06Q 20/4016 705/44 |
| 2016/0180343 A1* | 6/2016 | Poon | H04L 63/0861 705/44 |
| 2016/0283918 A1* | 9/2016 | Weinflash | G06Q 20/403 |
| 2016/0335639 A1* | 11/2016 | Merz | G06Q 20/4016 |
| 2016/0358179 A1* | 12/2016 | Canfield | G06Q 20/405 |
| 2017/0228733 A1* | 2/2017 | Jordan et al. | G06Q 20/409 |
| 2017/0171200 A1* | 6/2017 | Bao | H04L 9/3213 |
| 2017/0200142 A1* | 7/2017 | Pappano | G06Q 20/40 |
| 2017/0262851 A1* | 9/2017 | Canfield | G06Q 20/4016 |
| 2017/0270527 A1* | 9/2017 | Rampton | G06Q 20/102 |
| 2017/0270528 A1* | 9/2017 | Prakash | G06Q 20/3224 |
| 2017/0270557 A1* | 9/2017 | Maenpaa | G06Q 20/363 |
| 2017/0272253 A1* | 9/2017 | Lavender | H04L 63/12 |
| 2017/0352026 A1* | 12/2017 | Musil | G06Q 20/382 |
| 2018/0006821 A1* | 1/2018 | Kinagi | G06Q 20/4015 |
| 2018/0068395 A1* | 3/2018 | Gupta | G06N 3/08 |
| 2018/0234426 A1* | 8/2018 | Huang | H04L 9/0643 |
| 2018/0324197 A1* | 11/2018 | Zettel, II | H04L 43/062 |
| 2019/0026826 A1* | 1/2019 | Chebrole | G06Q 30/0607 |
| 2019/0042149 A1* | 2/2019 | Kesler et al. | G06F 3/0659 |
| 2019/0087805 A1* | 3/2019 | Hayes | G06Q 20/4016 |
| 2019/0087822 A1* | 3/2019 | Vasu | G06Q 20/4016 |
| 2019/0333089 A1* | 10/2019 | Fordyce, III | G06Q 30/04 |
| 2021/0117968 A1* | 4/2021 | Bhasin | G06Q 20/20 |
| 2021/0174361 A1* | 6/2021 | Potireddy | G06Q 20/352 |
| 2021/0398127 A1* | 12/2021 | LePage | H04L 63/0281 |

OTHER PUBLICATIONS

PCT International Search Report and Written Opinion dated May 29, 2018 in International Application No. PCT/US2017/056674, 13 pages.

* cited by examiner

SYSTEMS AND METHODS FOR INSTANT MERCHANT ACTIVATION FOR SECURED IN-PERSON PAYMENTS AT POINT OF SALE

CROSS-REFERENCE TO RELATED AND CO-PENDING APPLICATIONS

This application is a U.S. national stage application under § 371 of International Patent Application No. PCT/US17/56674, filed Oct. 13, 2017, which claims the benefit of U.S. Provisional Patent Application No. 62/540,514, filed Aug. 2, 2017, and entitled "Instant Merchant Activation for Secured In-Person Payments," the entireties of each are expressly incorporated herein in its entirety by reference.

BACKGROUND

A payment is a monetary or financial transaction (or simply transaction) that moves money from a source account to a destination account. For a non-limiting example, one common form of payment is credit card payment. A point of sale (POS) or point of purchase (POP) is the time and place of an in-person (vs. online) purchase where a retail payment transaction is completed between a merchant and a customer who makes a payment in exchange for goods or services from the merchant. A POS payment terminal or device is a payment transaction device associated with the merchant, wherein the POS payment terminal accepts a credit card, a debit card, or an EMV® chip card, such as Master, Visa, American Express, or Discover card from the customer and provides information of the card to the card issuer (e.g., credit card company) to process the transaction.

There are various types of POS payment terminals on the market and they all have one thing in common—they need to be certified upfront by the card issuers providing electronic payment processing services to the merchants to make sure that the POS payment terminals can function correctly and comply with the requirements set by the card issuers. The certification process is a rigorous underwriting process including full upfront review of the merchant via testing of the entire chain of electronic payment processing from the POS payment terminal through an acquirer to the card issuer. The certification process typically requires the merchant to first apply for certification of its POS payment terminal by an authorized third party, which handles the certification based on the rules set by EMVCo, a global organization that manages, maintains and enhances the global EMV® standard. Such certification process is often time-consuming. As the number of individual retailers (vs. traditional retail chain stores) are increasing rapidly, they would prefer their POS payment terminals to be activated ("on-board") and available to use instantly instead of waiting for the lengthy certification. Although some companies (e.g., Square) have offered their own proprietary POS payment terminals such as card readers to merchants for instant on-board usage, these terminals are limited to their own types only and still need to be certified. It is thus desirable to be able to instantly activate various kinds of existing POS payment terminals on the market without certification while still maintaining secured electronic payment processing via the POS payment terminals.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
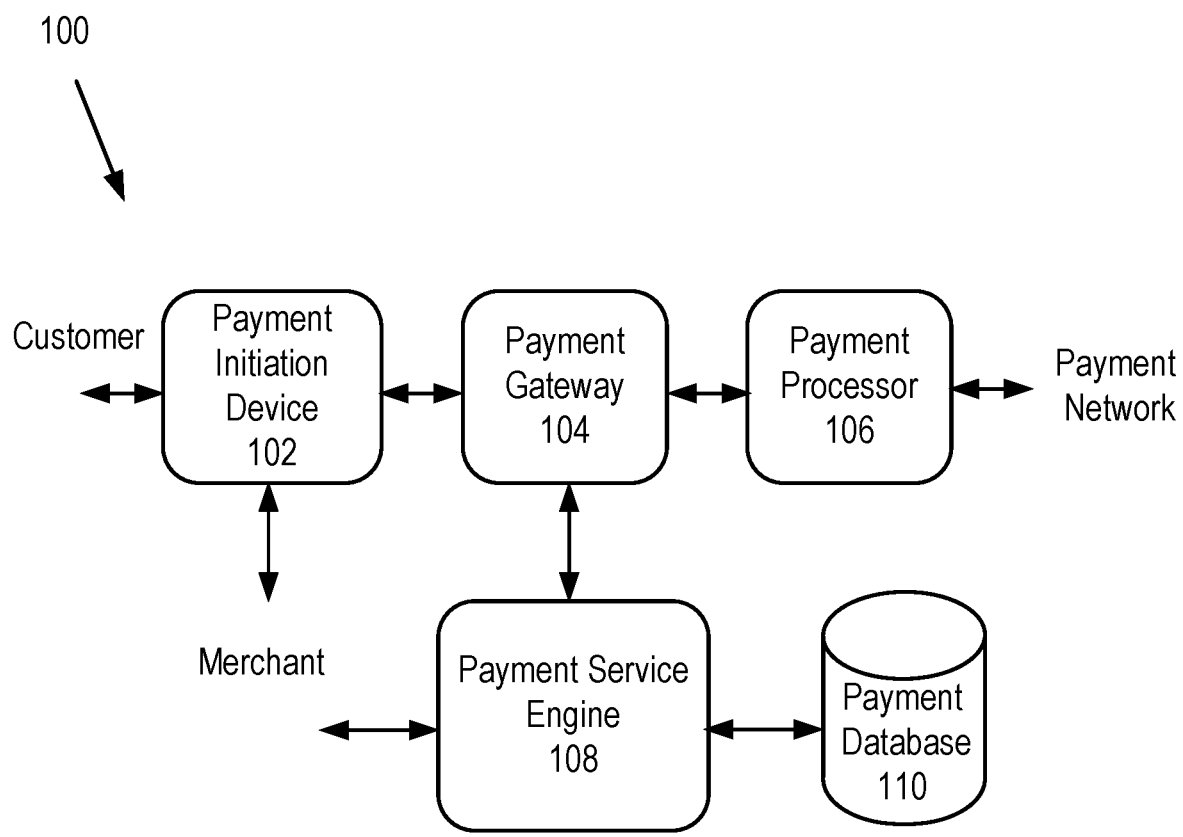
FIG. 1 depicts an example of a diagram of a system to support instant merchant activation for secured in-person payment at a POS of a merchant in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support instant merchant activation for secured in-person payment at a point of sale (POS) of a merchant. When a customer initiates an in-person payment request at a payment initiation device associated with the merchant, the payment initiation device is configured to collect both sensitive and non-sensitive portions of electronic payment transaction data for the request and encrypt the sensitive data portion for secured transmission. Upon receiving the electronic payment transaction data, a payment gateway in the payment transaction process is configured to relay the data to a payment processor for approval by an issuer and transmit only the non-sensitive portion of the data to a payment service engine for risk analysis if the payment request is approved by the issuer. The payment service engine is configured to determine if the payment request is at high risk based on risk analysis of the non-sensitive portion of the data received and notify the payment initiation device and/or the merchant accordingly.

By assessing the risk of each payment transaction without accessing sensitive financial information of the customer, the proposed approach enables instant activation of the merchant without weakening the security of the electronic payment transaction process. Under the proposed approach, the merchant can accept payment from its clients immediately via any type of POS payment device available on the market instantly while eliminating the lengthy certification process. In the meantime, since the sensitive financial data is encrypted and transmitted over the entire payment transaction process between the POS payment device and the payment processor following the conventional payment processing model, the security and integrity of the electronic payment transaction process is not weakened or compromised.

FIG. 1 depicts an example of a diagram of a system 100 to support instant merchant activation for secured in-person payment at a POS of a merchant. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a payment initiation device 102, a payment gateway 104, a payment processor 106, and a payment service engine 108. Each component of the system 100 runs on a computing unit/appliance/host (not shown) located at distributed geographical locations, with software instructions stored in a storage unit such as a non-volatile memory (also referred to as secondary memory) of the host for practicing one or more processes. When the software instructions are executed, at least a subset of the software instructions is loaded into memory (also referred to as primary memory) by the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the host to create specific logic circuits.

In the example of FIG. 1, each host running a component of system 100 can be a computing device, a communication device, a storage device, or any computing device capable of running a software component. For non-limiting examples, a computing device can be but is not limited to a laptop PC, a desktop PC, a tablet PC, or an x86 or ARM-based a server running Linux or other operating systems. In some embodiments, each host has a communication interface (not shown), which enables the components of the system 100 to communicate with each other and/or client devices 110 following certain communication protocols, such as TCP/IP, http, https, ftp, and sftp protocols, over one or more communication networks (not shown). The communication networks can be but are not limited to, internet, intranet, wide area network (WAN), local area network (LAN), wireless network, Bluetooth, WiFi, and mobile communication network. The physical connections of the network and the communication protocols are well known to those skilled in the art.

In the example of FIG. 1, the payment initiation device 102 associated with a merchant who wishes to accept payments from its customers is configured to enable a customer to initiate an (electronic) payment request (make a payment) for the merchant's products and/or services via his/her financial instrument, which can be but is not limited to, a credit card, a debit card, a prepaid card, an EMV® chip card, or a mobile communication device having a near-field communication (NFC) chip and an app to support mobile payment (e.g., Apple Pay via iPhone). In some embodiments, the payment initiation device 102 can be a dedicated/stand-alone POS payment terminal, a pin-pad linked to a POS payment terminal, a potable card reader attached to a mobile communication device, a mobile communication device capable of recognizing the financial instrument, or a device with integrated hardware and software that together accepts the payment request from the customer. Here, the mobile communication device can be but is not limited to, a smart phone, a tablet, an iPhone, ab iPad, a Google's Android device, and/or other types of mobile communication devices. In some embodiments, the payment initiation device 102 resides locally with the merchant and/or the customer and communicates remotely with the rest of the system 100 over the communication networks.

In some embodiments, upon receiving the payment request initiated by a customer, the payment initiation device 102 is configured to collect the electronic payment transaction data from the customer's financial instrument and/or the payment request. Here, the payment transaction data for the payment request can be collected by one of accepting card information manually entered by the customer, reading data stored on a magnetic stripe of a card swiped at the payment initiation device 102, reading data stored on a chip of a chip card inserted into the payment initiation device 102, and transmitting data from an NFC chip on a mobile communication device when tapped by the customer.

In some embodiments, the collected payment transaction data includes a sensitive data portion and a non-sensitive data portion. Here, the non-sensitive data portion includes information that can be used to identify the customer, including but not limited to one or more of name and/or billing address of the customer, non-sensitive part of a unique identifier/number of the financial instrument, e.g., the 1st 6 digits of a credit card (also known as the Issuer BIN) and last 4 digits of the credit card number, type of the financial instrument, brand of the financial instrument, e.g., Master, Visa, American Express, or Discover card, and how the payment transaction data of the financial instrument is collected. In some embodiments, the non-sensitive data portion of the payment transaction data further includes details of the payment request, e.g., the amount being requested for approval and a list of the products and/or services purchased, shipping address, and/or details of the merchant, e.g., merchant name or id, and information of the payment initiation device 102, e.g., device id and location. The sensitive data portion of the payment transaction data, on the other hand, includes confidential financial information of the financial instrument, including one or more of full (16 digits) card number, CVV code, expiration date, and other sensitive data stored on the financial instrument. If obtained by an unauthorized third party, the sensitive data portion may be used to initiate another payment request without the customer's knowledge or consent and thus needs to be securely guarded.

In some embodiments, the payment initiation device 102 is configured to encrypt the sensitive data portion using one or more keys provided by and shared only with the payment processor 106, wherein the encrypted sensitive data portion can only be decrypted by the payment processor 106. Note that only certified payment initiation devices 102 (e.g., certified POS terminals) may encrypt the data using the keys, wherein the payment initiation device 102 is injected with the keys either before the merchant receives the payment initiation device 102 or through an initial activation process. The payment initiation device 102 is then configured to transmit the payment request with both the non-sensitive data portion and the encrypted sensitive data portion of the electronic payment transaction data to the payment processor 106 for payment processing through the payment gateway 104.

In the example of FIG. 1, the payment gateway 104 located in the payment transaction process between the payment initiation device 102 and the payment processor 106. Here, the payment gateway 104 can be a stand-alone system, a piece of software such as an SDK embedded within the payment initiation device 102, or a component embedded within the payment processor 106. In some embodiments, the payment gateway 104 is configured to receive the payment request with both the non-sensitive data portion and the encrypted sensitive data portion transmitted by the payment initiation device 102. The payment gateway 104 is then configured to relay/transmit/forward both the non-sensitive data portion and the encrypted sensitive data portion with the payment request to the payment processor 106 for payment processing. Note the payment gateway 104 cannot access the encrypted sensitive data portion since the keys used to encrypt and decrypt the sensitive data are shared only between the payment initiation device 102 and the payment processor 106.

In the example of FIG. 1, the payment processor 106 is configured to decrypt the sensitive data portion of the electronic payment transaction data relayed by the payment gateway 104 using the keys shared only with the payment initiation device 102 and send the payment request with the electronic payment transaction data to an appropriate payment network, e.g., credit card network like Visa, Master Card or a PIN Debit network like STAR, PULSE etc. The payment network then sends the payment request and the electronic payment transaction data to the issuer/issuing bank of the financial instrument of the customer for approval and returns a response to the payment processor 106 as to whether the payment has been approved by the issuer or not, along with any other additional information by the issuer. Once the payment processor 106 has received confirmation that the payment request has been approved (or denied) by the issuer, it relays the confirmation and/or the additional information back to the payment initiation device 102 of the merchant via the payment gateway 104, wherein the payment initiation device 102 will complete the payment transaction process if the payment service engine 108 determines that the payment request is not at high risk as discussed in details below.

Once the payment gateway 104 receives the confirmation from the payment processor 106 that the payment request has been approved by the issuer, the payment gateway 104 is then configured to transmit only the non-sensitive data portion of the electronic payment transaction data to the payment service engine 108 for risk analysis to determine if the payment request should be processed or not by invoking an Application Program Interface (API) call to the payment service engine 108. Here, the non-sensitive data portion includes details about the transaction, the financial instrument, the customer, the merchant, etc. as discussed above, as well as the response returned by the payment processor 106 for risk analysis. Note that the payment gateway 104 does not have access to and thus does not send the sensitive data portion that includes sensitive data of the financial instrument, such as the full card number, to the payment service engine 108.

In the example of FIG. 1, the payment service engine 108 is configured to accept and analyze the non-sensitive data portion of the electronic payment transaction data from the payment gateway 104 in real time to determine whether the payment request should be processed or not. In some embodiments, the payment service engine 108 is associated with/provided by a third party payment service provider (e.g., WePay), which is a separate payment service entity outside of the conventional payment transaction process between the payment initiation device 102 and the payment processor 106. In some embodiments, the payment service engine 108 is responsible for underwriting the merchant since the certification process of the payment initiation device 102 and/or the merchant has been eliminated. Specifically, the payment service engine 108 is configured to assess the risk of the payment request in real time by analyzing the non-sensitive data portion of the payment transaction in view of historical payment transaction data of the customer and/or the merchant maintained in a payment database 110. For a non-limiting example, if the payment service engine 108 determines that the customer information in the non-sensitive data portion matches with a person in the payment database 110 whose payment request has been denied in the past, or the shipping address of the customer matches an address associated with fraud in the payment database 110, or the amount of the payment request is unusually higher than the historical payment requests for this category of merchant, the payment service engine 108 may determine that the payment request is at high risk and notify the payment gateway 104 and/or the merchant accordingly.

If the payment request is approved by the payment service engine 108, e.g., it is not at high risk and should be processed, the payment gateway 104 returns a successful response to the payment initiation device 102. If, on the other hand, the payment request is declined by the payment service engine 108, e.g., it is at high risk, the payment gateway 104 then returns a declined response to the payment initiation device 102 and also cancels the previously approved payment transaction with the payment processor 106. Upon receiving the response from the payment gateway 104, the payment initiation device 102 displays the appropriate result, e.g., payment approved or declined, accordingly to the customer and/or the merchant. The payment initiation device 102 or the payment service engine 108 will then settle the transaction amount of the payment request with the bank of the merchant.

Figure 2:
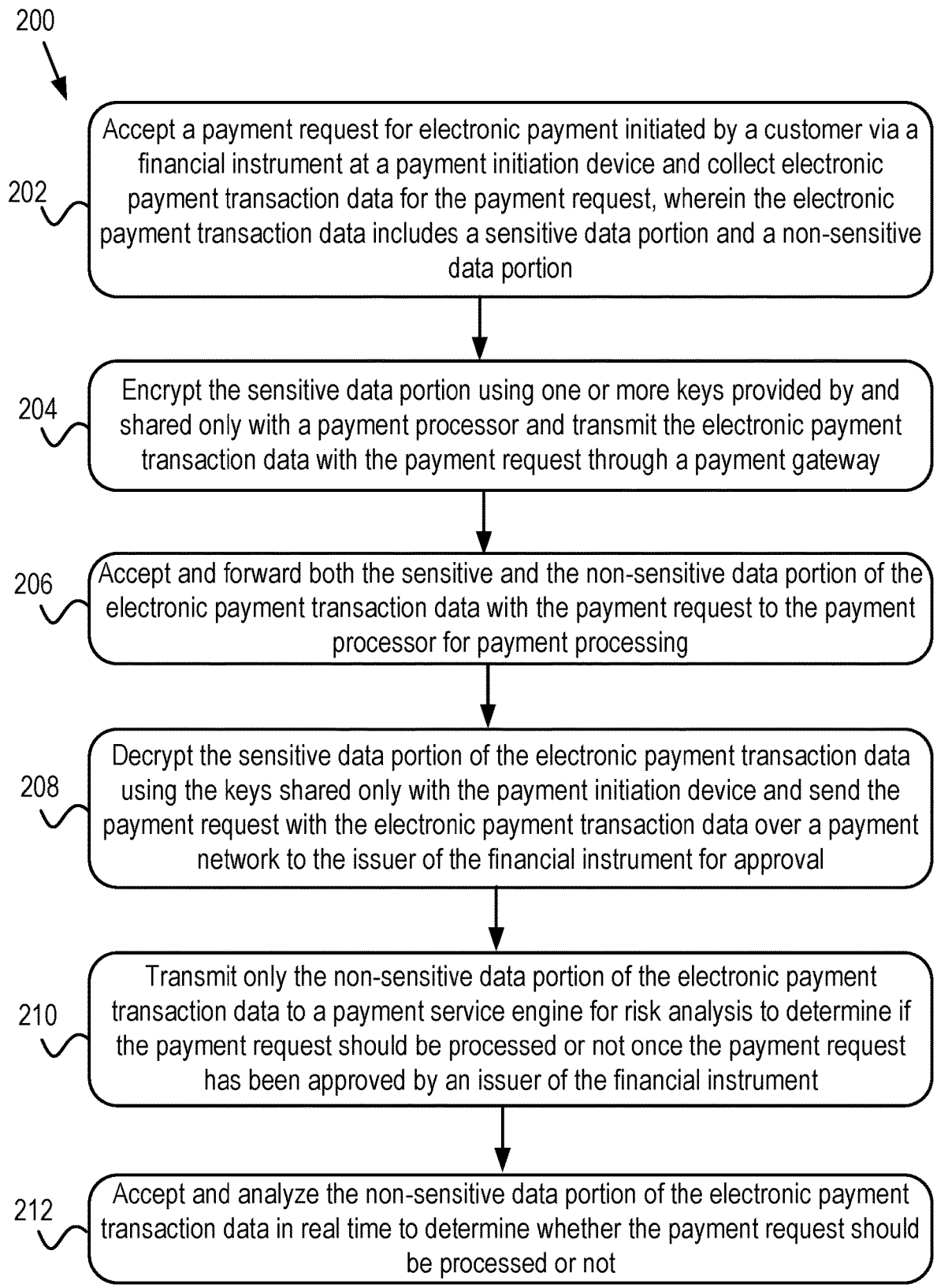
FIG. 2 depicts an example of a flowchart of a process to support instant merchant activation for secured in-person payment at a POS of a merchant in accordance with some embodiments.

FIG. 2 depicts an example of a flowchart of a process to support instant merchant activation for secured in-person payment at a POS of a merchant. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a payment request for electronic payment initiated by a customer via a financial instrument at a payment initiation device is accepted and electronic payment transaction data for the payment request is collected, wherein the electronic payment transaction data includes a sensitive data portion and a non-sensitive data portion. The flowchart 200 continues to block 204, where the sensitive data portion is encrypted using one or more keys provided by and shared only with a payment processor and the electronic payment transaction data is transmitted with the payment request through a payment gateway. The flowchart 200 continues to block 206, where both the sensitive and the non-sensitive data portion of the electronic payment transaction data are accepted and forwarded with the payment request to the payment processor for payment processing. The flowchart 200 continues to block 208, where the sensitive data portion of the electronic payment transaction data is decrypted using the keys shared only with the payment initiation device and the payment request is sent with the electronic payment transaction data over a payment network to the issuer of the financial instrument for approval. The flowchart 200 continues to block 210, where only the non-sensitive data portion of the electronic payment transaction data is transmitted to a payment service engine for risk analysis to determine if the payment request should be processed or not once the payment request has been approved by an issuer of the financial instrument. The flowchart 200 ends at block 212, where the non-sensitive data portion of the electronic payment transaction data is accepted and analyzed in real time to determine whether the payment request should be processed or not.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support instant merchant activation for secured in-person payment at a point of sale (POS) of a merchant, comprising:
   a payment initiation device associated with the merchant, which in operation, is configured to:
      accept a payment request for electronic payment initiated by a customer via a financial instrument and collect electronic payment transaction data for the payment request, wherein the electronic payment transaction data includes a sensitive data portion and a non-sensitive data portion;
      encrypt the sensitive data portion using one or more keys provided by and shared only with a payment processor and transmit the electronic payment transaction data with the payment request through a payment gateway;
   said payment gateway, which in operation, is configured to:
      accept and forward both the sensitive and the non-sensitive data portion of the electronic payment transaction data with the payment request to the payment processor for payment processing;
   said payment processor, which in operation, is configured to:
      decrypt the sensitive data portion of the electronic payment transaction data using the keys shared only with the payment initiation device and send the payment request with the electronic payment transaction data over a payment network to the issuer of the financial instrument for approval;
      receive, over the payment network, a confirmation approving the payment request from the issuer of the financial instrument; and
      transmit through the payment gateway and to the payment initiation device the confirmation approving the payment request;
   said payment gateway, which in operation, is further configured to:
      in response to receiving the confirmation approving the payment request, transmit only the non-sensitive data portion of the electronic payment transaction data to a payment service engine for risk analysis to determine if the payment request should be processed or not;
   said payment service engine, which in operation, is configured to:
      accept and analyze the non-sensitive data portion of the electronic payment transaction data in real time;
      perform a risk analysis comprising analyzing the non-sensitive data based on historical payment transaction data of the customer;
      determine whether the payment request is or is not at risk based on the risk analysis; and
      transmit a notification to the payment initiation device based on the determination, wherein the notification comprises a successful response when the payment request is determined to not be at risk and a declined response when the payment request is determined to be at risk.

2. The system of claim 1, wherein:
the financial instrument is a credit card, a debit card, a prepaid card, a chip card, or a mobile communication device having a near-field communication (NFC) chip and an app to support mobile payment.

3. The system of claim 1, wherein:
the payment initiation device is a stand-alone POS payment terminal, a pin-pad linked to a POS payment terminal, a potable card reader attached to a mobile communication device, a mobile communication device capable of recognizing the financial instrument, or a device with integrated hardware and software that together accepts the payment request from the customer.

4. The system of claim 3, wherein:
the payment initiation device is configured to collect the electronic payment transaction data by one of accepting card information manually entered by the customer, reading data stored on a magnetic stripe of a card swiped at the payment initiation device, reading data stored on a chip of a chip card inserted into the payment initiation device, and transmitting data from a near-field communication (NFC) chip on a mobile communication device when tapped by the customer.

5. The system of claim 1, wherein:
the non-sensitive data portion includes one or more of name and/or billing address of the customer, non-sensitive part of a unique identifier/number of the financial instrument, type of the financial instrument, and brand of the financial instrument.

6. The system of claim 5, wherein:
the non-sensitive data portion further includes details of the payment request including one or more of the amount being requested for approval, a list of the products and/or services purchased, name or id of the merchant, and device id and/or location of the payment initiation device.

7. The system of claim 1, wherein:
the sensitive data portion includes one or more of full card number, CVV code, expiration date, and other sensitive data stored on the financial instrument.

8. The system of claim 1, wherein:
the payment gateway is a stand-alone system, a piece of software embedded within the payment initiation device, or a component embedded within the payment processor.

9. The system of claim 1, wherein:
the payment gateway is configured to access only the non-sensitive portion of the electronic payment transaction data.

10. The system of claim 1, wherein:
the payment gateway is configured to transmit the non-sensitive data portion of the electronic payment transaction data to the payment service engine by invoking an Application Program Interface (API) call to the payment service engine.

11. The system of claim 1, wherein:
the payment service engine is provided by a third party payment service provider, which is a separate payment service entity outside of the payment transaction process between the payment initiation device and the payment processor.

12. The system of claim 1, wherein:
the payment service engine is configured to assess the risk of the payment request in real time by analyzing the non-sensitive data portion of the payment transaction in view of historical payment transaction data of the customer and/or the merchant.

13. The system of claim 1, wherein:
the payment service engine is configured to notify the payment initiation device and/or the merchant of assessment of the risk of the payment request via the payment gateway.

14. A computer-implemented method to support instant merchant activation for secured in-person payment at a point of sale (POS) of a merchant, comprising:
accepting a payment request for electronic payment initiated by a customer via a financial instrument at a payment initiation device and collecting electronic payment transaction data for the payment request, wherein the electronic payment transaction data includes a sensitive data portion and a non-sensitive data portion;
encrypting the sensitive data portion using one or more keys provided by and shared only with a payment processor and transmitting the electronic payment transaction data with the payment request through a payment gateway;
accepting and forwarding both the sensitive and the non-sensitive data portion of the electronic payment transaction data with the payment request to the payment processor for payment processing;
decrypting the sensitive data portion of the electronic payment transaction data using the keys shared only with the payment initiation device and sending the payment request with the electronic payment transaction data over a payment network to the issuer of the financial instrument for approval;
receiving, over the payment network, a confirmation approving the payment request from the issuer of the financial instrument; and
transmitting through the payment gateway and to the payment initiation device the confirmation approving the payment request;
in response to receiving the confirmation approving the payment request, transmitting only the non-sensitive data portion of the electronic payment transaction data to a payment service engine for risk analysis to determine if the payment request should be processed or not;
accepting and analyzing the non-sensitive data portion of the electronic payment transaction data in real time;
performing a risk analysis comprising analyzing the non-sensitive data based on historical payment transaction data of the customer;
determining whether the payment request is or is not at risk based on the risk analysis; and
transmitting a notification to the payment initiation device based on the determination, wherein the notification comprises a successful response when the payment request is determined to not be at risk and a declined response when the payment request is determined to be at risk.

15. The computer-implemented method of claim 14, further comprising:
collecting the electronic payment transaction data by one of accepting card information manually entered by the customer, reading data stored on a magnetic stripe of a card swiped at the payment initiation device, reading data stored on a chip of a chip card inserted into the payment initiation device, and transmitting data from a near-field communication (NFC) chip on a mobile communication device when tapped by the customer.

16. The computer-implemented method of claim 14, further comprising:
accessing only the non-sensitive portion of the electronic payment transaction data by the payment gateway.

17. The computer-implemented method of claim 14, further comprising:
transmitting the non-sensitive data portion of the electronic payment transaction data to the payment service engine by invoking an Application Program Interface (API) call to the payment service engine.

18. The computer-implemented method of claim 14, further comprising:
assessing the risk of the payment request in real time by analyzing the non-sensitive data portion of the payment transaction in view of historical payment transaction data of the customer and/or the merchant.

19. The computer-implemented method of claim 14, further comprising:

notifying the payment initiation device and/or the merchant of assessment of the risk of the payment request via the payment gateway.

20. A non-transitory computer readable storage medium having software instructions stored thereon that when executed cause a system to:

accept a payment request for electronic payment initiated by a customer via a financial instrument at a payment initiation device and collect electronic payment transaction data for the payment request, wherein the electronic payment transaction data includes a sensitive data portion and a non-sensitive data portion;

encrypt the sensitive data portion using one or more keys provided by and shared only with a payment processor and transmit the electronic payment transaction data with the payment request through a payment gateway;

accept and forward both the sensitive and the non-sensitive data portion of the electronic payment transaction data with the payment request to the payment processor for payment processing;

decrypt the sensitive data portion of the electronic payment transaction data using the keys shared only with the payment initiation device and send the payment request with the electronic payment transaction data over a payment network to the issuer of the financial instrument for approval;

receive, over the payment network, a confirmation approving the payment request from the issuer of the financial instrument; and transmit through the payment gateway and to the payment initiation device the confirmation approving the payment request;

in response to receiving the confirmation approving the payment request, transmit only the non-sensitive data portion of the electronic payment transaction data to a payment service engine for risk analysis to determine if the payment request should be processed or not;

accept and analyze the non-sensitive data portion of the electronic payment transaction data in real time;

perform a risk analysis comprising analyzing the non-sensitive data based on historical payment transaction data of the customer;

determine whether the payment request is or is not at risk based on the risk analysis; and transmit a notification to the payment initiation device based on the determination, wherein the notification comprises a successful response when the payment request is determined to not be at risk and a declined response when the payment request is determined to be at risk.

* * * * *